United States Patent [19]

Saner

[11] 4,114,708
[45] Sep. 19, 1978

[54] CONVEYOR TYPE SCALE

[75] Inventor: Kaspar Saner, Dubendorf, Switzerland

[73] Assignee: K-Tron Soder AG, Niederlenz, Switzerland

[21] Appl. No.: 806,212

[22] Filed: Jun. 13, 1977

[30] Foreign Application Priority Data

Jun. 16, 1976 [CH] Switzerland .......................... 7773/76

[51] Int. Cl.² ........................................... G01G 11/00
[52] U.S. Cl. ................................... 177/145; 177/253; 198/504
[58] Field of Search .................. 198/504, 505; 177/16, 177/145, 151, 119–121, 226, 253

[56] References Cited

U.S. PATENT DOCUMENTS 3,119,457  1/1964  Thompson ........................... 177/145
3,743,039  7/1973  Vogt ..................................... 177/16

Primary Examiner—Joseph W. Hartary
Attorney, Agent, or Firm—Seidel, Gonda & Goldhammer

[57] ABSTRACT

The invention concerns a conveyor type scale with a stand. A carrier attached to the stand and a conveyor belt rests on the carrier. A mechanism for measuring a load is provided. A transmitting means places the carrier in operational contact with the load-measuring mechanism. The carrier includes two tables, which are connected to each other. A first link mechanism connects the two tables to one another and a second link mechanism connects each table to the stand.

7 Claims, 5 Drawing Figures

U.S. Patent  Sept. 19, 1978  Sheet 2 of 2  4,114,708

CONVEYOR TYPE SCALE

BACKGROUND OF THE INVENTION

Such conveyor type scales are known as three-link scales and are already known. In general, they serve to determine the quantity, with respect to time (volume per time unit) of the material conveyed by the belt. Such scales can be used to determine the quantity conveyed within a given time period, through integration by means of time, or to stop the supply after the required total quantity is obtained, or to continually direct the quantities per time unit to their required set point. The quantity per time is the product of the belt speed and the load per unit of belt length.

Previously known conveyor type scales have links with swivel joints, i.e., hinged joints. Such conveyor type scales are quite well suited for measuring relatively large loads. However, when small loads are also to be measured and small load changes are to be determined, the link friction has a very disruptive effect. When the table is first loaded and afterwards, is unloaded again, it does not return to its exact starting position again. Therefore, link friction causes hysteresis.

In addition, when the measuring sensitivity is high, heating up by means of the conveyor belt sliding over the table, also has a disruptive effect. First of all, the table expands due to heating. In addition to this, often the table is made of a material with relatively low heat conduction, for instance, stainless steel. Therefore, between the upper and lower sides of the table, a difference in temperature results. Accordingly, the tables expand to a greater extent on top, than underneath, so that torques occur in the tables, which cause deformation. Therefore, heating resulting from the conveyor belt friction, causes distortions and agitations of the carrier, i.e., in the tables and links. Depending on the set-up of the transmitting device, these distortions and agitations are transmitted more or less severely to the load-measuring device and can therefore cause errors in measurement.

Conveyor type scales are used in continous operations, i.e., from 8 to 24 hours per day, often under strong vibrations (from 1 to 9 m/s$^2$). These vibrations reduce the lifespan of the transmitting device and in particular of its links, as well as of the measuring device.

SUMMARY OF THE INVENTION

The invention concerns a conveyor type scale with a stand. A carrier attached to the stand and a conveyor belt rests on the carrier. A means for measuring a load is provided. A transmitting means places the carrier in operational contact with the load-measuring means. The carrier includes two tables, which are connected to each other. A first link means connects the two tables to one another and a second link means connects each table to the stand.

The invention deals with the problem of producing a conveyor type scale in which hysteresis is at least practically avoided, so that small loads and load changes can also be accurately measured. In addition, the invention should make it possible to avoid having measuring errors result from the heating up of the carrier, caused by friction on the belt. Finally, despite high measuring sensitivity, the invention should make it possible still further, to attain relatively high vibration resistance capacity and therefore, a longer lifespan.

This problem is solved by a conveyor type scale of the previously mentioned kind, which in accordance with the invention, is characterized by the fact that each of its links has at least one link spring.

The carrier is located at a predetermined conveyance point, in operational contact with the transmitting means, which in its turn, is in operational contact with the load-measuring means. Then the bending moment (restoring turning moment per angle unit) of the three links can be adjusted to the position of the conveyance point in such a way that the thrust transmitted from the carrier to the transmitting device, and the conveyance point height show practically no change when the carrier is heated up due to friction on the belt, so that the friction heat causes no measuring error. Under the bending moment (restoring turning moment per angle unit) of a link, that resetting torque is to be understood, which occurs when both parts, connected to each other by the link are swung out of their normal position, against each other, by an angle unit measured, for instance, in radians. In other words, the bending moment (restoring moment per angle unit) is equal to that quantity which results when, upon deflection of the parts connected to each other by the respective link, out of their normal operational position, the resetting torque is divided by the angle of the deflection. In accordance with the location of the conveyance point, the bending moment (restoring turning moment per angle unit) of the link connecting both tables with each other, should be the same as, or smaller than half of the geometric mean of the bending moment (restoring turning moment per angle unit) of the two other links.

BRIEF DESCRIPTION OF THE INVENTION

For the purpose of illustrating the invention, there are shown in the drawings forms which are presently prefered; it being understood, however, that this invention is not limited to the precise arrangements and instrumentalities shown.

DETAILED DESCRIPTION OF THE INVENTION

Figure 1:
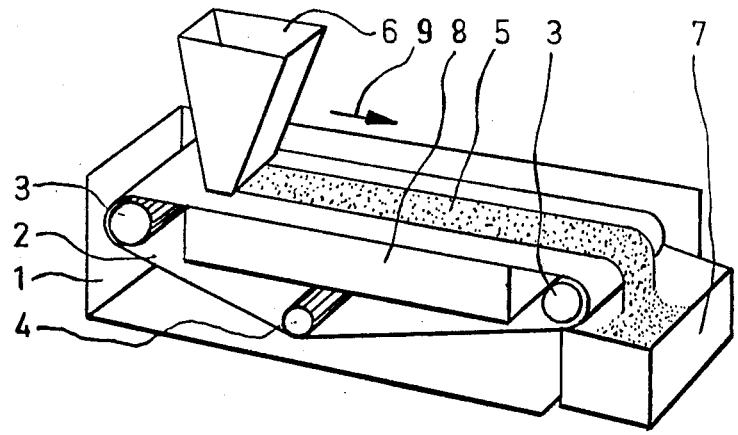
FIG. 1 is an perspective view of one conveyor type scale.
Figure 2:
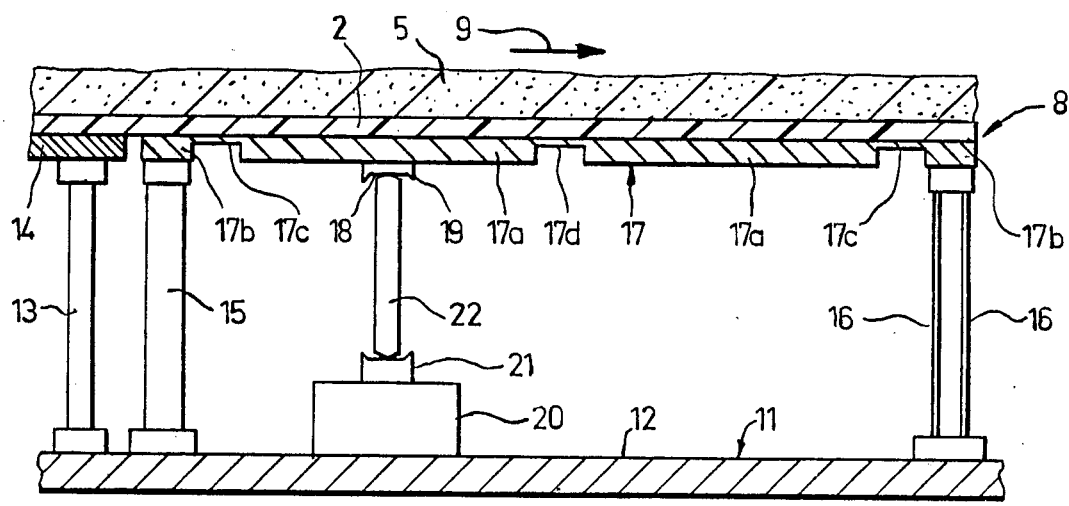
FIG. 2 is a cross-section through the weighing mechanism of this conveyor type scale along the line 2—2 of FIG. 3, on a larger scale.

Referring to the drawings in detail, wherein like numerals indicate like elements, there is shown in FIG. 1 a conveyor type scale having a housing 1 in which a conveyor belt 2 is conducted across rollers 3. A roller 4 serves as a tension roller. The material 5 to be weighed falls from the feeding hopper 6 to the conveyor belt 2. Immediately underneath the conveyor belt 2, a weighing mechanism 8, attached to the housing 1, is set up. The weighing mechanism 8 is preferably within a separate housing. During operation, conveyor belt 2 is moved by a non-depicted motor. The material to be weighed is conveyed in the transporting direction indicated by arrow 9, over the weighing mechanism 8, to an outlet hopper 7. The weighing mechanism 8, the interior of which is depicted in FIG. 2, has a stand 11, with an inflexible support 12 attached to the housing 1. A table 14 is inflexibly attached to the support 12 by means of vertical uprights 13. The conveyor belt 2 rests underneath the hopper 6 on the upper side of table 14.

A carrier 17 is attached to the support 12 by vertical uprights 15 and 16. The carrier 17 is disposed further on in the transporting direction 9 than the table 14. Two inflexible profile bars 15 are set up as uprights at the corners of the carrier 17 which are nearest the table 14. The uprights 16, set up at the other end of the carrier 17, are constructed as elastically flexible metal sheets parallel to each other. The dimension of the uprights 16, which is at right angles to the transporting direction 9, is generally greater than the dimension parallel to the direction of travel 9.

There can either be two metal-sheet type uprights, which extend over approximately the entire breadth of the carrier 17, or two pairs of uprights 16, which are set up at the corners of the carrier 17.

Figure 3:
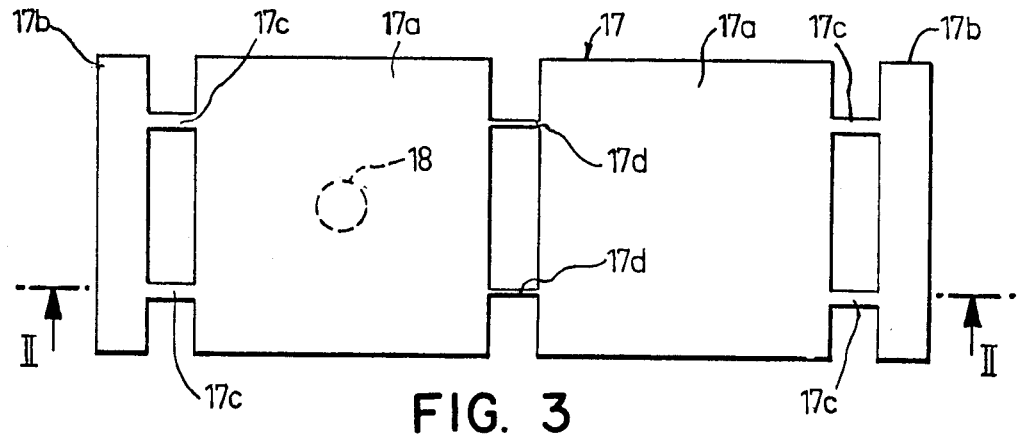
FIG. 3 is a top view of the carrier.

The carrier 17 consists of a one-piece metal sheet, for instance, a stainless steel sheet. When the conveyor belt 2 is not moved, the upper surface of the carrier 17 is on a plane with the upper surface of the table 14. Carrier 17, depicted separately in FIG. 3, is subdivided by three groups of grooves, slots and indentations running at right angles to the transporting direction 9, and then into two tables of equal length 17a and two hinge brackets 17b forming the end parts. The brackets 17b are in the form of rectangular beams and have essentially smaller extension in the transporting direction 9 than the tables 17a. At right angles to the transporting direction, the brackets 17b have the same extension as the tables 17a.

One of the hinge brackets 17b is attached to the uprights 15 and the other, to the uprights 16. Each hinge bracket 17b is connected to a table 17a, adjacent to it, at the upper surfaces of the carrier 17, by means of two cross-pieces which form leaf spring type link springs 17c. Both tables 17a are connected to each other by means of two leaf spring type link springs 17d. The link springs 17c and 17d are symmetrically arranged with respect to the vertical longitudinal median plane of the carrier 17, and are approximately one quarter of the carrier's breadth distant from the longitudinal rims of the carrier 17. Measured in the transporting direction 9, the link springs are of equal length. The height or thickness of the link springs, measured in a vertical direction, is equal, for all link springs 17c and 17d. The height or thickness of the link springs 17c and 17d, measured in a vertical direction, amounts to, at the most one-third, and is for instance 20% of the material thickness in the vertical direction of the tables 17a and the brackets 17b. The breadth of each link spring 17c, measured at right angles to the transporting direction 9, amounts to some 5% of the breadth of the tables 17a. The breadth of each link spring 17d, amounts to approximately one-sixth of that of each link spring 17c. In each case, two of the link springs 17c, which are next to each other, as well as the two links springs 17d, which are next to each other, together form an elastic link. Or in other words, the link consists exclusively of the link springs and has no other movable parts as, for example, pivot pins.

On the bottom side of one of tables 17a, approximately at the application point 18, an anvil or cup-shaped member 19 is attached. The application point 18 is in the middle of the table. A load-measuring device 20, with a vertically-movable anvil or cup-shaped member 21 is attached to the support 12. Between the anvils 19 and 21, a transmitting device 22 is set up, which is schematically depicted as a vertical bar. The ends of the vertical bar are constructed as very dull edges enmeshed in the anvils. As a load-measuring device 20, a known force transducer can be used which has, for instance, a wire strain gauge or a piezoelectric crystal. However, a mass transducer, with vibrating strings or wires, can also be used as is described in U.S. Pat. Nos. 3,423,999; 3,692,128 and 3,621,713. The load-measuring device 20 is in operational contact with the conveyance point 18 of the carrier 17 by means of the transmitting device 22. Upon operation of the conveyor type scale, the load-measuring device 20 produces an electric signal which gives a measurement for the loading of the carrier 17 with the quantity of the material 5 which are located on the conveyor belt 2 and on the tables 17a. It is preferable that one of the anvils 19 or 21 be movable, so that the zero position can be adjusted. In addition, it is preferable that the transmitting device 22 be provided with an overload safety device which prevents overloading of the load-measuring device 20. It goes without saying that separate stops can be provided also as overload safety devices. Also, if required holders and controls to hold and control the transmitting device 22 may be provided.

For instance, the conveyor type scale can be used to fill up the containers which are set up below the output hopper 7. Therefore, the quantity filled up is a result of the producting-filling period times the quantity of material conveyed, per time unit. The electric signal produced by the load-measuring device 20 can, for example, be conveyed to a control loop which regulates the transport speed of the conveyor belt 2 in such a way that prescribed quantities of the material 5 can be filled up.

The load-measuring device 20 is construced in such a way that it operates almost without moving any distance so that, for example, a change by some kilo pounds, e.g., 2 to 10 kp, in the force pressing on the anvil 21, equals an anvil deflection of only approximately 0.01 mm. The three pairs of link springs 17c and 17d form three practically hystereris-free links. When, for example, an additional load is placed on the carrier already loaded, and this is subsequently removed, the carrier returns to its exact starting position. Therefore, very small loads and load changes can be measured.

The conveyor belt 2 rests on the upper surface of the carrier 17 and during operation, glides over this. Therefore, friction heat occurs, the magnitude of which depends on the transport speed of the conveyor belt, the plane weight of the material 5, resting on the belt and on the smoothness of the conveyor belt and of the carrier. By friction heat, depending on conditions, the temperature can be raised to some 40° to 80° C. Such a rise in temperature results in expansion of the carrier. Since the thermal conductivity coefficient of the carrier 17 has only a limited magnitude and is even relatively small for stainless steel, a temperature gradient, downwards from above, develops in tables 17a of the carrier. Therefore, tables 17a are expanded more severely on their upper surfaces, on which the conveyor belt rests, than on their lower surfaces. Therefore, stress develops in the tables 17a which produce and cause local torques so that the link-sided rims of the tables 17a buckle downwards with respect to the center of the table.

Figure 4:
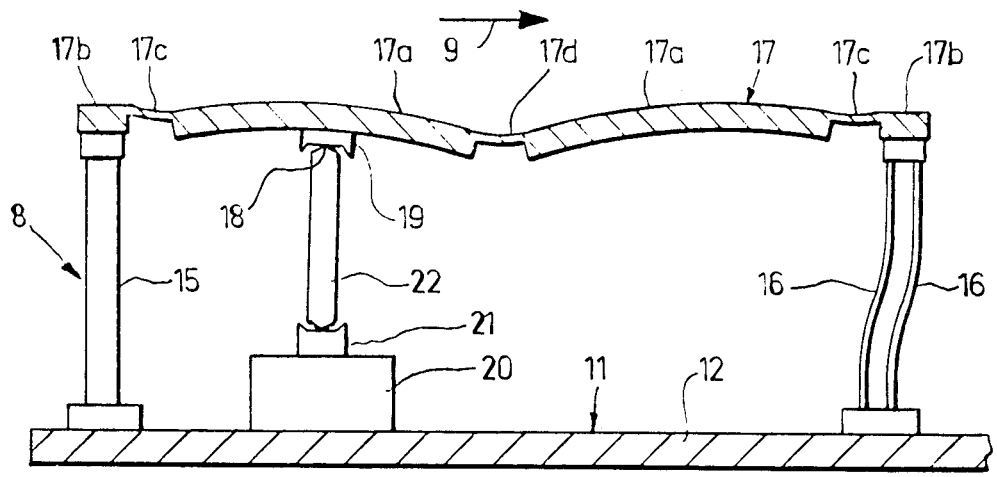
FIG. 4 is a cross-section corresponding to FIG. 2, in which deformations caused by friction heat are depicted in a greatly exaggerated way.

These deformations of carrier 17 are depicted in exaggerated form in FIG. 4. The change in the length of carrier 17 is absorbed by a bending of the uprights 16 along a vertical plane parallel to the transporting direction 9. The hinge bracket 17b of the carrier 17, located on the right side of FIG. 4, is therefore moved approximately parallel to the transport direction without being deflected. Then the uprights 16 form an elastically parallel guidance for the hinge bracket 17b, which forms the inflexible part connected to the stand 11 of the link formed by the two link springs 17c found on the right side of FIG. 4.

The link springs 17d are measured at right angles to the transporting direction 9 horizontally, as already mentioned, and are some six times thinner than the link springs 17c. The link formed by both link springs 17d, connecting both tables 17a to each other, correspondingly has, therefore, a bending moment (restoring turning moment per angle unit) approximately six times smaller than both the outer links, each of which is formed by two link springs 17c. This ratio between the bending moments (restoring turning moments) precisely guarantees that the conveyance point 18 of the carrier 17, at which the carrier acts on the transmitting device, when deformation occurs, does not change its height relative to the load-measuring device 20. Also, the thrust conveyed from the carrier to the transmitting device, does not change. In this way, even with greater measuring sensitivity, load-measuring is not influenced by deformation due to friction heat. The conveyor belt 2, not depicted in FIG. 4, must of course be satisfactorily deformable so that it adapts itself to the deformation of the carrier 17. Also, in the area of carrier 17, the conveyor belt 2 must transmit the weight of the quantity of material resting on it to the carrier.

Figure 5:
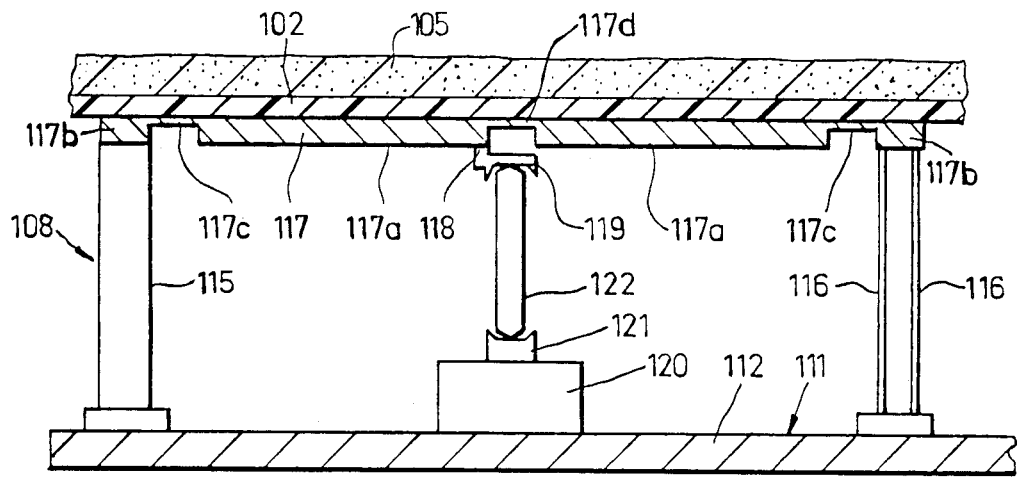
FIG. 5 is a cross-section, corresponding to FIG. 2, through a variation of the weighing mechanism.

The weighing mechanism 108, depicted in FIG. 5, has a stand 111 with a support 112. Uprights 115 and 116 are attached to the support 112 and support a carrier 117 over which a conveyor belt 102 runs. During operation, the conveyor belt 102 carriers the material 105 to be measured. An anvil 119 is attached to the carrier 117. The carrier 117 is in operational contact with an anvil 121 of the load-measuring device 120 by means of a transmitting device 122. The carrier 117 again consists of a connecting, i.e., a one-piece operating part and has two equally large tables 117a, two hinged brackets 117b, two link springs 117c, as well as two link springs 117d.

The weighing mechanism 108 is different from the weighing mechanism 8 due to the fact that the transmitting device 122 acts upon another conveyance point 118 of the carrier 117. The conveyance point 118 is in the middle of carrier 117. So that the deformation of the carrier 117, caused by the belt friction, may not occasion any measurement error, i.e., any changes in the thrust transmitted to the anvil 121, each link spring 117d should have a breadth, measured at right angles to the transporting direction 9, which is approximately half of the breadth of each link spring 117c. The bending moment (restoring turning moment per angle unit), in this case, of the link formed by a pair of link springs 117d is, therefore, at least approximately equal to half of the bending moment (restoring turning moment per angle unit) of each link formed by a pair of links 117c.

Of course, still other locations of the conveyance point can be provided for. The bending moments (restoring turning moments) of the links are to be correspondingly adjusted for the location of the various conveyance points. However, it can be shown that the bending moment (restoring moment per unit angle) of the link connecting both the tables with each other, in the case of two equally large tables, should be at the most equal to half of the geometric mean of the bending moments (restoring turning moments per unit angle) of both the other links. When the bending moment (restoring turning moment per unit angle) of the middle link connecting both the tables with each other is designated by D, and the bending moment (restoring turning moment per unit angle) of both the other links are designated $D_1$ and $D_2$, the condition termed by the following unequal equation can be expressed:

$$D \leq (\sqrt{D_1 \cdot D_2}/2)$$

Each of the three bending moments (restoring turning moments) is determined by the geometric form, by the dimensions, and by the elasticity modulus of the springs belonging to the respective link.

Should the conveyance point be in the middle of the carrier, the equal sign applies. But then, when the conveyance point is moved back against one of the other links, the bending moment (restoring turning moment) D must be smaller than half of the geometric mean of both the other bending moments (restoring turning moments). The further away the conveyance point is from the link connecting both tables with each other, the smaller the bending moment (restoring turning moment per unit angle) D must be.

The exact value of the bending moment (restoring turning moment) D can either be calculated or be determined by several experiments. Should the experimental method be selected, the ratios of the bending moments (restoring turning moments) and the location of the conveyance points, to each other, must be determined in such a way that the deformation of the carrier, which occurs because of the heating occasioned by belt friction, produces no errors in measurement or only a minimal one. Otherwise, the measurements of the link springs and the values of the bending moment (restoring turning moment) must of course be determined by the dimensions of the substance and the material characteristics of the carrier and the desired measuring range.

The elastic links can be formed from only one, or from two ore more link springs. Of course, it would be possible to provide the different links with a variable number of springs. Should all the springs be of the same length and height, i.e., have vertical material thickness, for the accomplishment of the unbalanced equation, the entire breadth of all the springs which belong to the link connecting both the tables to each other, must at the most, be equal to half of the entire breadth of all the springs, belonging to the some other link.

Finally, it must be stated that it would be possible to manufacture the link springs, the tables and the hinge brackets out of separate components. The springs would then have to be attached to the tables and the hinge brackets.

The present invention may be embodied in other specific forms without departing from the spirit or essential attributes thereof and, accordingly, reference should be made to the appended claims, rather than to the foregoing specification as indicating the scope of the invention.

I claim:

1. A conveyor type scale comprising:
    a stand;
    a carrier attached to the stand;
    a conveyor belt resting upon said carrier;
    means for measuring a load;

transmitting means for placing the carrier in operational contact with the measuring means;

said carrier including two tables;

first link means connecting said two tables to one another and second link means connecting each table to said stand;

each link means including at least one link spring.

2. A conveyor type scale in accordance with claim 1 wherein each link spring is of the leaf spring type and the breadth of each leaf spring is disposed substantially horizontal.

3. A conveyor type scale in accordance with claim 1 wherein said carrier includes a pair of brackets, each bracket being connected to said stand and at least one of said link springs of said second link means connecting one of said brackets to each table, and said tables, said link springs and said bracket being formed of a single continuous piece of material.

4. A conveyor type scale in accordance with claim 2 wherein the upper surfaces of said tables and the upper surfaces of said link springs lie in the same plane.

5. A conveyor type scale in accordance with claim 1 wherein the bending moment of the first link means connecting the tables is equal to, at the most, half of the geometric mean of the bending moment of the second link means connecting a table to the stand.

6. A conveyor type scale in accordance with claim 2 wherein each link spring has substantially the same thickness, and substantially the same length, is parallel to the direction of travel of said conveyor belt, and the total breadth of all link springs connecting said tables to one another being equal to at the most one-half the total breadth of all link springs belonging to the same link means connecting one of said tables to said stand.

7. A conveyor type scale in accordance with claim 3 wherein at least one of said brackets is connected to said stand by at least two uprights, said uprights being of equal length, being parallel to each other, being disposed generally vertically, and being elastically flexible along a vertical plane, said plane being parallel to the direction of travel of said conveyor belt.

* * * * *